Figure 1:
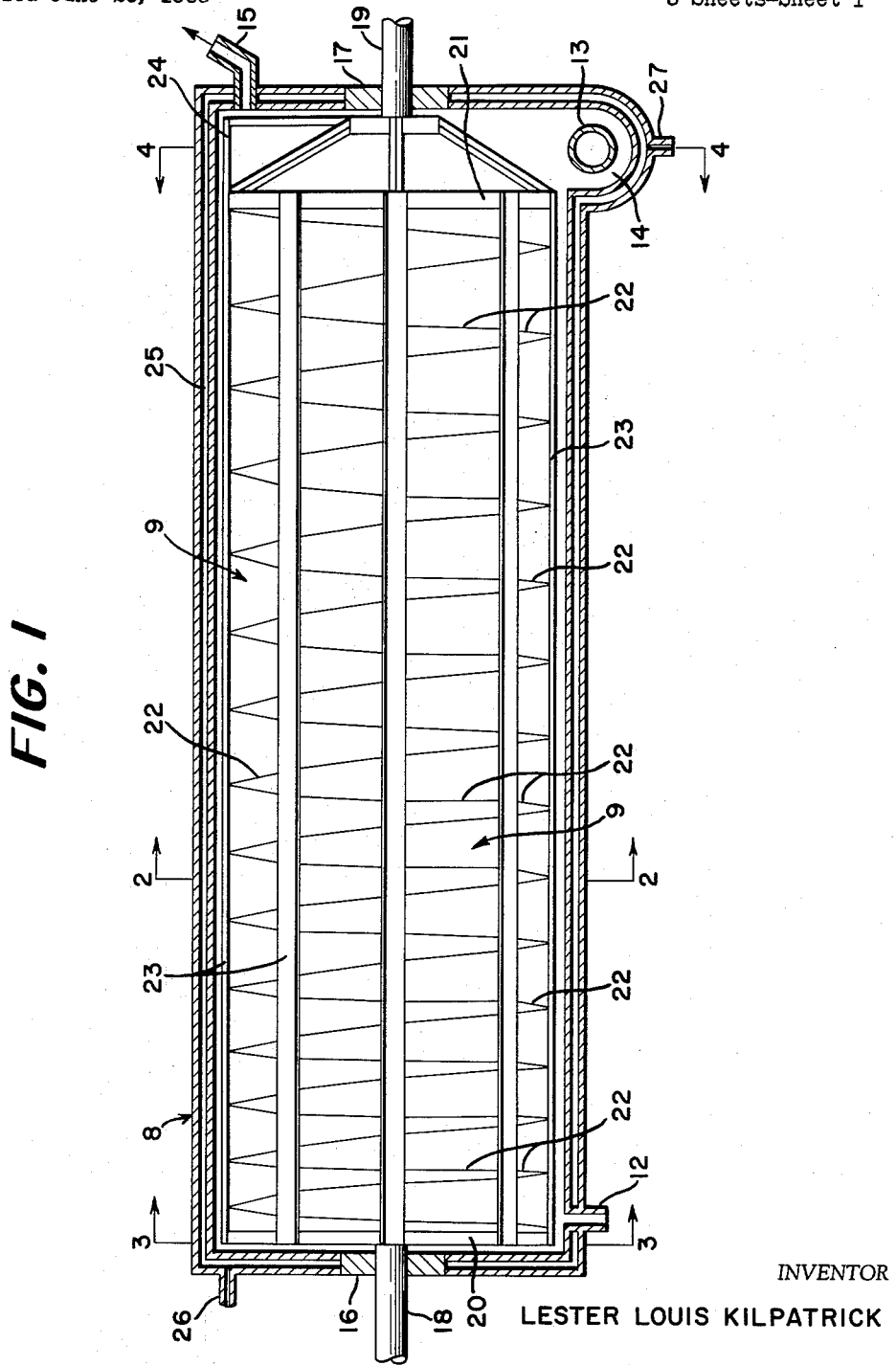

April 26, 1966  L. L. KILPATRICK  3,248,180
POLYMER FINISHER APPARATUS
Filed June 23, 1965  3 Sheets-Sheet 1

FIG. I

INVENTOR
LESTER LOUIS KILPATRICK
BY *Norris E. Ruckman*
ATTORNEY

April 26, 1966 — L. L. KILPATRICK — 3,248,180
POLYMER FINISHER APPARATUS
Filed June 23, 1965 — 3 Sheets-Sheet 2

INVENTOR
LESTER LOUIS KILPATRICK

BY *Ronia E. Ruckman*
ATTORNEY

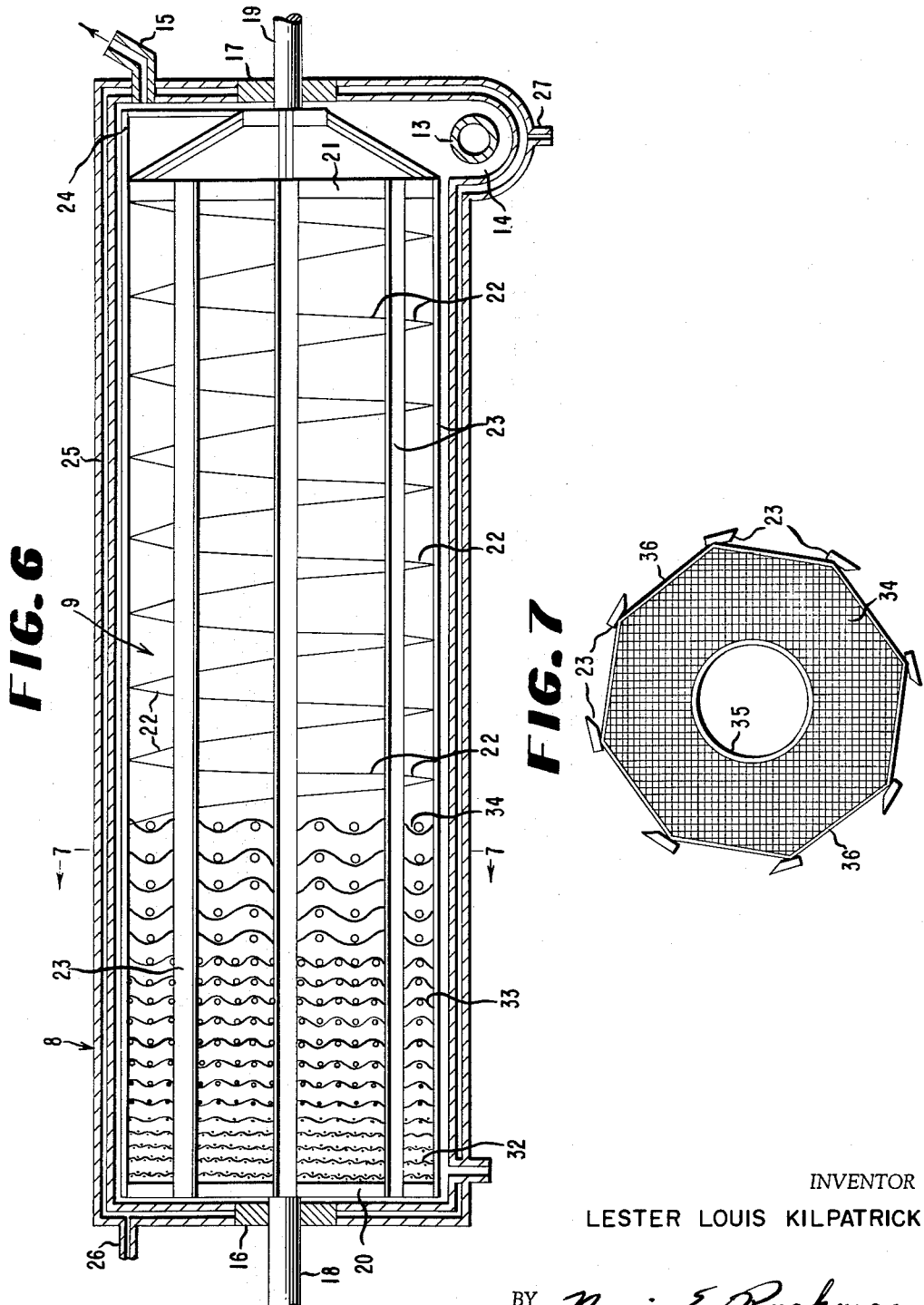

United States Patent Office 3,248,180
Patented Apr. 26, 1966

3,248,180
POLYMER FINISHER APPARATUS
Lester Louis Kilpatrick, Grifton, N.C., assignor to E. I. du Pont de Nemours and Company, Wilmington, Del., a corporation of Delaware
Filed June 23, 1965, Ser. No. 470,313
7 Claims. (Cl. 23—285)

This is a continuation-in-part of my application Serial No. 307,498, filed September 9, 1963, and now abandoned.

This invention relates to an apparatus for converting a liquid of low viscosity into a liquid of high viscosity by removal of a volatile material, being particularly adapted for polycondensation reactions in which volatile material is removed and a polymeric material of high viscosity is produced which remains in a liquid state at the temperature prevailing during the reaction.

The commercial preparation of most linear condensation polymers, such as polyesters or polyamides, involves heating monomeric starting materials to cause progressive condensation with loss of low molecular weight volatile material until the desired molecular weight level is achieved. In a typical example, polyethylene terephthalate is formed from bis-2-hydroxyethyl terephthalate by heating the starting material at proper temperatures, generally, at increasingly lower pressures, with evolution of ethylene glycol until the desired fiber or film-forming viscosity is achieved. The process is usually carried out in two or more stages with intermediate formation of a low-molecular weight, low-viscosity polymeric liquid which is then passed through vessels which are maintained at proper temperatures and low pressures. Vessels of this type are customarily known as "polymer finishers."

The problems associated with the proper design of polymer finishers have long been recognized and described in the prior art. Finishers such as those described by Willey, U.S. Patent No. 3,046,099, dated July 24, 1962, and Pierce et al., U.S. Patent No. 3,057,702, dated October 9, 1962, have been shown to function satisfactorily to produce polymer with uniform viscosity in the normal range required for the presently known polymeric yarns. However, as the need grew for improved yarns with higher tenacities, it was necessary to increase the relative viscosity of the polymer from the finisher to such a point that it was impossible to generate sufficient surface in the highly viscous material in a sufficiently short time to prevent excessive degradation of the polymer. The screens and flights described by the prior art require wide spacing to prevent the higher viscosity polymer from bridging the space between them. For high viscosity polymer, the increased spacing would require the polymer finisher to be excessively large and impractical.

It is, therefore, an object of this invention to provide an improved polymer finisher apparatus which is particularly useful for preparing high viscosity polymer.

This object is accomplished according to this invention by an improved finishing apparatus of a type having a cylindrical polymerization vessel having its longitudinal axis disposed in a substantially horizontal plane and having an inlet for liquid near one end, an outlet for liquid near the other end, an outlet for vapor near at least one of the ends, and an agitator mounted for rotation within the vessel. An improved agitator is provided which comprises a cylindrical cage having an outside diameter only slightly less than the inside diameter of the cylindrical vessel and having a plurality of peripheral bars arranged parallel to the longitudinal axis of the vessel that are connected by generally helical rods arranged as chords of the cylindrical cage, and having mounted within the cage a plurality of film-formative wires, each extending from an intersection of a bar with a rod substantially in a plane perpendicular to the longitudinal axis. Preferably, the film-formative wires lie within the surface defined by the helical rods, which rods are mounted within and supported by about 8 peripheral bars. Each of these film-formative wires extends between two intersections of bars with rods, but additional wires may extend to the intersections of the film-formative wires, as hereinafter described.

Figure 2:
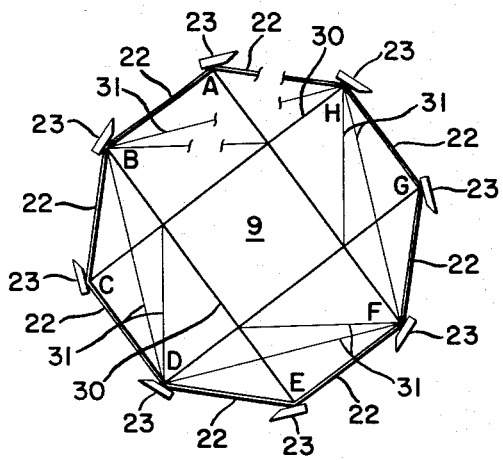
Figure 3:
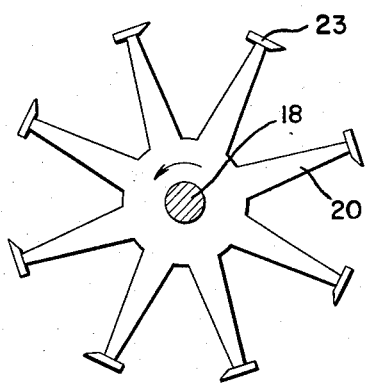
Figure 4:
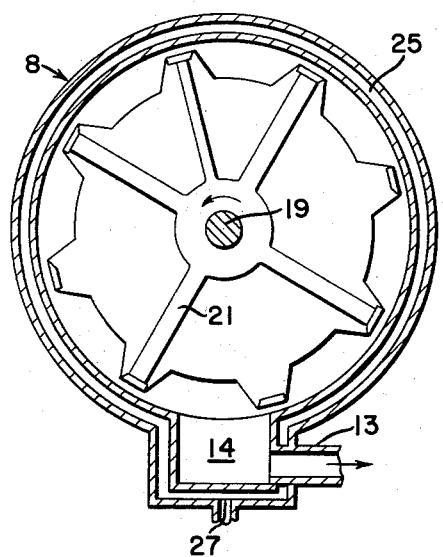
Figure 5:
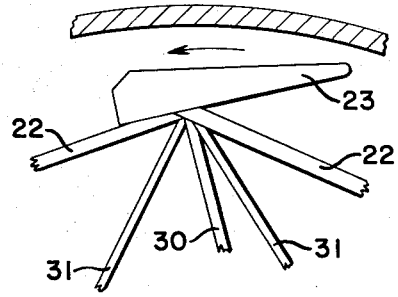

In the drawing, which illustrates a preferred embodiment of the apparatus,

FIGURE 1 is a longitudinal axial section of the cylindrical polymerization vessel with the cylindrical agitator cage shown in elevation, FIGURE 2 is a typical transverse section of the cylindrical agitator taken on line 2—2 of FIGURE 1, FIGURE 3 is a transverse section taken on line 3—3 of FIGURE 1 to show the end wheel nearest the inlet end of the vessel, FIGURE 4 is a transverse section of the cylindrical polymerization vessel taken at line 4—4 in FIGURE 1, FIGURE 5 is a detail enlargement of a portion of the agitator, FIGURE 6 is a view corresponding to FIGURE 1, but showing a modified form of agitator cage, and FIGURE 7 is a transverse section of the cylindrical agitator taken on line 7—7 of FIGURE 6.

FIGURE 1 is a view with one-half of the polymerization vessel 8 cut away to show the agitator 9 mounted within it, as seen in side-elevation. Vessel 8 has inlet 12 in the lower part of the vessel near one end to receive liquid and outlet 13 communicating with well 14 in the lower part of the vessel near the other end to discharge liquid. Vent 15 for discharging vapor is located in the upper portion of the vessel at the discharge end. If desired, a vent may be provided at each end. Journals 16 and 17, at opposite ends of the vessel, rotatably mount shafts 18 and 19 extending axially from spoked or otherwise perforated end wheels 20 and 21 of the agitator 9. The shafts are rotated by suitable means (not shown) outside the vessel.

The agitator 9, shown in FIGURE 1, includes helical rods 22 arranged as chords of the cylindrical cage 9, spaced at increasing pitch progressing from the inlet end to the outlet end of the vessel. The helical rods are mounted within and are supported by a number of peripheral bars 23 extending between and mounted upon the end wheels 20 and 21. Trapezoidal blade 24 affixed to shaft 19 at the outlet end of the vessel has a height equal to the radius of the cylindrical cage. Vessel 8 is surrounded by jacket 25 provided with suitable inlet and outlet vents 26 and 27 for the circulation of fluid means for maintaining the desired temperature. Heat is usually supplied to the vessel, although in some instances, removal of heat may be necessary.

FIGURE 2 illustrates a transverse section of a portion of the cylindrical cage 9 which comprises helical rods 22 affixed to the peripheral bars 23, arranged in a helical curve. Four wires 30 illustrated in FIGURE 2 extend between the points of intersection of the peripheral bars and the helical rods connecting points $\overline{AF}$, $\overline{BE}$, $\overline{CH}$, and $\overline{DG}$. Additional film-supporting wires 31, shown extending to other intersections, are desirable, especially in the region nearest the inlet end, which is the region of lower viscosity.

FIGURE 3 illustrates, in a corresponding view, the end wheel forming the connection between shaft 18 and peripheral bars 23 at the inlet end of the vessel. The spokes of the wheel are preferably formed and placed in close proximity to the interior end of the vessel to function as scrapers or wipers to continually remove the material being processed from the end surface of the vessel.

FIGURE 4 is a transverse section of the vessel and agitator mounted within it, taken at the line 4—4 in FIGURE 1 at the outlet end of the vessel, showing perforated end wheel 21. FIGURE 4 also shows the well 14 in the lower part of the vessel from which finished polymer is drawn off through outlet 13. Removal of the product may be facilitated by use of an exhaust pump (not shown) in the outlet line.

FIGURE 5 is an enlargement of a typical welded connection between rods 22 and peripheral bar 23, and wires 30 and 31. FIGURE 5 also shows a preferred taper of bar 23 whose outer and inner sides define an included angle of between 10° and 25°.

Operation of the finisher is described with the aid of the drawings as follows:

Liquid of relatively low viscosity is forced by suitable means into the inlet of the vessel and passed to the other end and out the outlet, the flow being effected by gravity and the motion of the helical bars 22 of FIGURE 1. As the agitator turns, hot liquid is carried up and transversely filmed around the vessel by the film-formative wires. As the film is carried away from the main body of the liquid, its large surface area facilitates rapid evaporation of volatile components. The vapor flows between the agitator and vessel through the open area defined by the helical bars and the vessel, through the openings in the wheel 21, and out of the vessel through vent 15 which is usually maintained at low pressure by employing suitable vacuum-producing means (not shown).

The horizontal cylindrical finishers of the prior art have described rotating screens or discs in order to generate the polymer surface area to promote the diffusion of the volatile component of the liquid being processed and have described flights to move the polymer. The amount of surface area that can be generated and the hold-up time with such rotating screens, discs, or flights, is set by their required spacing from each other which is limited by agitator speed, liquid viscosity, and element design. It is surprising, therefore, to find that the elimination of the screen-type foraminous members and flights of the prior art and replacement with the above construction eliminates the flooding associated with screen-type, foraminous members and flights, and provides better regulation of flow through the vessel.

In the apparatus embodiment shown in the figures, end wheel 20 serves to wipe the inlet end of the vessel in a manner similar to the wiping of the cylindrical wall by the peripheral bars 23. At the outlet end, end wheel 21 is spaced away from the vessel wall to facilitate passage of vapors into the vent 15 while blade 24 serves to wipe the wall. If desired, the blade may be omitted and the outlet wall may also be wiped by the end wheel. In such a case, the perforations in the end wheel and the outlet vent are suitably shaped and spaced so that a continuous open passage for vapor removal can exist as the agitator rotates. Of course, if a vent is provided at each end of the vessel, the apparatus will be adapted at each end for vapor removal and wiping action.

In practice, the dimensions of the vessel and the agitator, the number and spacing of the foraminous wires, and the agitator speed will depend upon the throughput of the liquid being processed. The following ranges of size have been found desirable for a vessel constructed to hold a 32-inch diameter agitator and utilized for the polycondensation of polyethylene terephthalate having a low degree of polymerization and an absolute viscosity of above 500 poises to produce highly polymeric polyethylene terephthalate having an absolute viscosity of 10,000 to 150,000 poises. Depending on the viscosity of the liquid to be processed, ⅟₁₆- to ½-inch radial clearance and end clearance is preferred. The peripheral bars are 2 to 4 inches wide, preferably tapering in cross-section from about ⅞ inch to about ⅛ inch, and long enough to attach to the end wheels 20 and 21. The helical rods 22 are fabricated from ¼-inch square bar stock. Flat bar stock ⅜ by ¾ inch is desirable for larger agitators. The film-formative wires are preferably ⅟₃₂ inch to ¼ inch in diameter and arranged in the configuration shown in FIGURE 2. The pitch of the helix is selected according to the melt viscosity and varies from ¾ inch to 5 inches as the melt viscosity of the polymer builds up, as a function of the distance from the inlet to the outlet, from 500 to 150,000 poises.

The shafts 18 and 19, illustrated in FIGURE 1, are shown extending axially from the ends of the agitator 9 through journals 16 and 17. It is also possible to use, on one end of the agitator, a stub shaft rotatably mounted in a journal located entirely within the vessel 1. This arrangement eliminates the necessity for a stuffing box around one shaft and reduces the power needed to rotate the agitator.

To obtain the optimum surface generation with the agitator of this invention, it is desired to operate at a speed just below the critical point at which the polymer of high viscosity tends to ball-up. Depending on the melt viscosity, the agitator is preferably operated at a rate of about 0.3 to 10 complete turns per minute.

The modified form of apparatus illustrated in FIGURES 6 and 7 is sometimes desirable for the finishing of polymer through a wide range of viscosities in a single apparatus. In the initial portion of this apparatus, the film-supporting wires are in the form of woven wire screens 32–34 having a central opening reinforced with a rim 35. The screens are supported by rods 36 welded to the peripheral bars 23. As shown, the screens 32, nearest the polymer inlet, are relatively fine; and the screens are progressively coarser as the polymer is conveyed away from the inlet. The intermediate screens 33 are fairly coarse, and the last screens 34, where the polymer viscosity has increased substantially, are quite coarse. The screens 34 may have a mesh of not less than 1 inch and are preferably spaced at least 1 inch apart. The remainder of the agitator has helical rods 22 with film-supporting wires 30 and 31, as disclosed previously, instead of screens.

While the apparatus has been described for the processing of polyethylene terephthalate polymer, the apparatus is also readily adaptable to the processing of other linear condensation polymers, such as the preparation of polyhexamethylene adipamide from a low molecular weight condensate of hexamethylene diamine and adipic acid. The invention can also be employed in the evaporation of dilute solutions of viscous liquids to remove part, or all, of the solvent from the dissolved liquid, being especially useful in the processing of such high viscosity liquids which are prone to degradation when heated for prolonged periods of time.

Since many different embodiments of the invention may be made without departing from the spirit and scope thereof, it is to be understood that the invention is not limited by the specific illustrations except to the extent defined in the following claims.

I claim:

1. In a polymer finishing apparatus having a generally cylindrical polymerization vessel with the longitudinal axis disposed in a substantially horizontal plane and having an inlet for liquid near one end, an outlet for liquid near the other end and an outlet for vapor near one of the ends, the improvement of an agitator mounted for rotation inside the vessel in the form of a cylindrical cage having an outside diameter only slightly less than the inside diameter of the vessel and comprising perforated end wheels supported on rotatable shafts aligned with the longitudinal axis of the vessel, a plurality of peripheral bars extending between said wheels parallel to the axis of the cage, generally helical rods arranged as chords of the cage and connecting the bars to form the cylindrical surface of the cage, and a plurality of film-formative wires mounted within the cage, each of the said wires extending from an intersection of a bar with a rod substantially in a plane perpendicular to the longitudinal axis of the vessel and having both ends of the wire secured in position within the agitator cage.

2. Apparatus as defined in claim 1 wherein the film-formative wires each have the two ends attached at intersections of the helical rods with non-adjacent peripheral bars.

3. Apparatus as defined in claim 1 wherein the helical rods are mounted within and supported by about 8 peripheral bars and each of said wires extends from an intersection of helical rods with a first bar toward an intersection with another bar which is separated by up to two bars from the first bar and is non-adjacent thereto.

4. Apparatus as defined in claim 3 wherein said bars are tapered along the longitudinal sides, the outer and inner sides defining an included angle of between 10° and 25°.

5. Apparatus as defined in claim 1 wherein agitator means are provided in close proximity to the ends of the vessel to continually remove material being processed from the interior surfaces of the vessel as the agitator rotates.

6. Apparatus as defined in claim 1 wherein the helical rods are spaced at increasing pitch from the inlet end to the outlet end of said vessel.

7. Apparatus as defined in claim 1 which has film-formative wires in the form of spaced apart, woven wire screens at the portion of the agitator that is adjacent to the liquid inlet into the vessel, said screens being supported perpendicular to said peripheral bars and being progressively coarser in a direction away from said inlet.

References Cited by the Applicant

UNITED STATES PATENTS

| | | |
|---|---|---|
| 2,813,780 | 11/1957 | Vieli. |
| 3,031,273 | 4/1962 | Latinen. |
| 3,046,099 | 7/1962 | Willey. |
| 3,057,702 | 10/1962 | Pierce et al. |

MORRIS O. WOLK, *Primary Examiner.*